Patented Oct. 15, 1940

2,218,439

UNITED STATES PATENT OFFICE 2,218,439

POLYMERIC ESTERS

Henry S. Rothrock, Wilmington, Del., assignor to E. I. du Pont de Nemours & Company, Wilmington, Del., a corporation of Delaware No Drawing. Application August 5, 1937, Serial No. 157,631

1 Claim. (Cl. 260—78)

This invention relates to new unsaturated esters and to processes for their preparation and polymerization. More particularly, it relates to esters of monohydric unsaturated alcohols such as methallyl and crotyl, with saturated polycarboxylic acids.

This invention has as an object the provision of a process for the preparation of esters of allyl type alcohols. Further objects are coating compositions comprising such esters. A further object is the preparation of solvents and plasticizers.

These objects are accomplished by the following invention wherein an allyl type alcohol, i. e., an unsaturated alcohol in which the carbinol group is attached to an open chain unsaturated carbon atom is reacted with an ester of the desired polycarboxylic acid with an alcohol more volatile than the allyl type alcohol under the catalytic influence of an alkaline material.

In the process of the present invention an allyl type alcohol is reacted with a polycarboxylic acid ester of a more volatile alcohol under such conditions that the more volatile alcohol is displaced from the polycarboxylic acid ester by the allyl type alcohol and is eliminated from the reaction mixture by distillation. The reaction proceeds rapidly and almost quantitatively under suitable conditions to yield the desired allyl type ester of the polycarboxylic acid. Under suitable conditions these esters can be polymerized to form products ranging from viscous liquids to hard insoluble polymers. Milder polymerization conditions may be used to prepare viscous soluble "drying" oils useful for the production of varnishes and enamels.

In attempts to prepare esters from allyl type alcohols and saturated polycarboxylic acids it has been found that the usual methods of esterification are not suitable. For example, in an effort to prepare an ester by direct esterification of allyl alcohol and adipic acid, it was found that reaction took place very slowly in the absence of a catalyst. The addition of catalytic amounts of mineral acids such as sulphuric acid to accelerate the reaction served to bring about extensive decomposition and rearrangement of the allyl alcohol, with the result that no ester was formed. Methallyl alcohol behaved similarly, the main product of the rearrangement being isobutyraldehyde. Other allyl type alcohols also fail to esterify according to these orthodox methods. In some cases the weak acidity of the organic acid alone is sufficient to promote this decomposition of allyl alcohols.

It is, however, possible to prepare allyl type alcohol esters of saturated polycarboxylic acids by ester interchange under alkaline conditions at relatively low temperatures. According to this process, the allyl type alcohol is condensed with a lower ester of the saturated polycarboxylic acid (such as the methyl or ethyl ester) in the presence of an alkaline catalyst. The allyl type alcohol displaces the methyl or ethyl alcohol from the polycarboxylic acid ester, and the methyl or ethyl alcohol is then distilled from the reaction mixture as formed. The reaction is very suitably carried out in solution in inert solvents such as benzene or toluene, which serve to assist in the removal of the alcohol of reaction by distillation as a binary mixture. The reaction usually requires from 6 to 10 hours for completion, depending upon the quantity of catalyst and the reactivity of the particular compounds used. The reaction time can be shortened by employing higher temperatures of reaction, for example, by using less solvent or a higher boiling solvent, e. g., xylene. Larger amounts of catalyst aid in shortening the reaction time. The distillation can ordinarily be carried out at such a rate as to distill the alcohol of reaction (methanol or ethanol) at about the rate at which it is given off in the interchange reaction. The quantity of this alcohol eliminated can be determined readily by washing it from the benzene distillate with water and measuring the change in volume. The reaction products can be worked up in any desired manner. The reaction products are generally washed with water and then distilled, but the invention is not limited to this means of purification.

Esters prepared from allyl alcohols and saturated polycarboxylic acids possess the desirable and very interesting property of polymerizing under suitable conditions to give products of value. Under mild treatment, the thin, mobile monomeric esters can be polymerized or thickened to yield soluble viscous sirups or, under more drastic polymerizing conditions, can be set up to insoluble gels and finally to hard, solid resins. The viscous soluble polymers possess the very desirable property of drying or polymerizing in thin layers to yield hard, flexible, light-colored films and are therefore of definite value in the field of coating compositions. Generally these polymerizations of the viscous sirup in films are carried out in the presence of catalytic proportions of metallic driers, for example, cobalt linoleate or manganese naphthenate. While the sirups will dry in the air under suitable conditions, the rate of such drying is generally slow and it is much more desirable to use the products in baking compositions. Good films may be obtained from certain of the esters on baking for less than one hour at 100° C.

The more detailed practice of the invention is illustrated by the following examples, wherein parts given are by weight unless otherwise stated. There are of course many forms of the invention other than these specific embodiments.

*Example I*

A mixture of 258 parts (1 mole) of ethyl sebacate, b. p. 129° C./1 mm., 216 parts (3 moles) of methallyl alcohol, and 250 parts of benzene was heated at reflux under an efficient column equipped with a variable take-off. To the boiling mixture was added 8 parts of a catalyst solution prepared by dissolving 5 parts of metallic sodium in 100 parts of absolute ethyl alcohol. Distillation was carried out at such a rate that the ethanol was carried over about as fast as formed, as a binary mixture with benzene. The interchange proceeded at a good rate. Benzene was added from time to time to replace that distilled during the course of the reaction, and small additional quantities of catalyst were also added to aid the reaction. When ethanol ceased to distill from the reaction mixture (as evidenced by the rise of the vapor temperature to 80° C.) the reaction was considered complete and the resulting benzene solution was filtered, washed thoroughly with water, dried over calcium chloride. After removal of the benzene by distillation, the residual liquid was distilled at reduced pressure. It was found to boil at 165–170° C./1 mm. A total yield of 275 grams of material was obtained as a colorless fluid liquid. The product was the dimethallyl ester of sebacic acid, as indicated by the iodine number: 164.3 as compared with the value of 163.9 calculated for $C_{18}H_{30}O_4$.

A portion of the ester was heated in the presence of 1% of benzoyl peroxide at 260° C. In 30 minutes the product had polymerized to a viscous sirup, which was soluble in butyl acetate. This sirup in the presence of 0.03% metallic cobalt drier dried in thin layers to a flexible, colorless, adherent, and water-resistant film on baking one hour at 100° C. On longer heating at 260° in the presence of benzoyl peroxide, the product gelled to an insoluble and infusible product. Polymerizations at lower temperatures require correspondingly longer times, to produce essentially similar products.

*Example II*

A mixture of 110 parts (0.55 mole) of diethyl adipate, 108 parts (1.5 moles) of methallyl alcohol, and 300 parts of benzene was subjected to an ester interchange reaction in a manner similar to that described in Example I. The total reaction time required was 5 hours. There was obtained 122 parts of purified ester boiling at 161–163° C./9 mm.

The dimethallyl adipate prepared as described above polymerized very slowly at 100° C., both in the presence and in the absence of benzoyl peroxide as catalyst. With 1% benzoyl peroxide the ester polymerized to a viscous soluble sirup in two hours at 225° C. Films flowed from a butyl acetate solution of this sirup with added cobalt drier (0.03% metallic cobalt) set to dry flexible surfaces in 30 minutes at 130° C. Completely dried films prepared in this manner possessed excellent water-resistance.

A zinc-oxide enamel was prepared as follows: 30 grams of American process zinc oxide pigment was ground with 15 grams of the viscous soluble sirup prepared above and 10 grams of hi-flash naphtha. A highly dispersed stable enamel resulted. On adding 0.03% cobalt drier the enamel could be air dried or baked satisfactorily. Baked films were hard in 30–60 minutes at 100° C. Exposure panels of this enamel indicated excellent durability.

*Example III*

A mixture of 146 parts (1 mole) of ethyl oxalate, 216 parts (3 moles) of methallyl alcohol, and 300 parts of benzene was treated with 8 parts of sodium methylate catalyst (prepared by dissolving 5 parts of sodium in 100 parts of absolute methanol), and the mixture subjected to an ester interchange reaction as described in Example I. After operating for one and one-half hours, 10 parts additional catalyst was added. Sufficient benzene to replace that distilled in the operation was added at intervals. The reaction was completed when the distilling temperature of the benzene vapors rose to and remained at 80° C. even when operating the column at total reflux. On working up the product as described in Example I, a total of 177 parts of colorless liquid boiling at 113° C./8 mm. was obtained. This product was the dimethallyl ester of oxalic acid.

*Example IV*

Ethyl succinate (130 parts, 0.75 mole) was combined with 180 parts (2.5 mole) of methallyl alcohol, in benzene solution using sodium methylate as catalyst. About six and one-half hours were required to complete the reaction. On distillation, 180 parts of colorless liquid boiling at 138–140° C. at 8 mm. was obtained. This product was the dimethallyl ester of succinic acid.

On heating at 100° C. in the absence of catalysts no change was observed even after 48 hours. In the presence of 1% of benzoyl peroxide, a slight thickening action was observed after 8 hours at 100° C., and the mixture gelled to an insoluble product in 12 hours. Correspondingly shorter periods of heating were required to produce the same effect at higher temperatures. Thus at 200° C. in the presence of 1% benzoyl peroxide, gelation occurred after 3½ hours. The thickened product prepared by heating a mixture at a point short of gelatin may be dissolved in organic solvents and employed as a coating agent in the same fashion as described in Examples I and II.

*Example V*

From a mixture of 120 parts (three-quarters mole) of diethyl malonate, 180 parts (2.5 moles) of methallyl alcohol, and 300 parts of benzene, there was obtained under the same operating conditions as described in Example I a total of 145 parts of colorless ester boiling at 128–130° C./9 mm. This material was the dimethallyl ester of malonic acid.

At 100° C., in the absence of catalysts, there was no change in this ester even after 48 hours, but in the presence of 1% benzoyl peroxide the product thickened slowly, forming after 16 hours a soft, gel-like mass. Polymerization at higher temperatures occurred more rapidly. In seven hours at 200° C. in the presence of 1% benzoyl peroxide, a thick, colorless, soluble sirup was obtained. When dissolved in suitable solvents, this bodied ester was suitable for use in coating compositions, requiring only a short baking time at

Example VI

From 110 parts (0.50 mole) of ethyl citrate and 144 parts (2 moles) of methallyl alcohol, there was obtained by a process similar to that described in Example I 102 parts of a pale, straw-colored liquid boiling at 202–208° C. at 7 mm. This product was the methallyl ester of citric acid.

On heating at 100° C. both in the presence and the absence of benzoyl peroxide, the product thickened very slowly and at the end of 72 hours had set to a clear, stiff gel, insoluble in organic solvents. The viscous bodied product obtained prior to gelation can be dissolved in organic solvents and used in the preparation of coating compositions as a baking varnish or enamel.

Example VII

Ethyl α-α-β-γ-propanetetracarboxylate (99.6 parts, 0.3 mole) was combined with 1.44 parts (2 moles) of methallyl alcohol according to the ester interchange process described in Example I. On working the product up, as described above, there was obtained 80 parts of a yellow, straw-colored liquid boiling at 230° C. at 8 to 10 mm. This product was the methallyl ester of α-α-β-γ-propanetetracarboxylic acid.

On heating for a short period of time in the presence of benzoyl peroxide (1%), polymerization took place. Thus after two hours at 100° C. a soft, insoluble gel was formed. On heating up to 72 hours at 100° C. this gel was converted into a very hard, insoluble product, having an amber color.

Example VIII

By the ester interchange reaction, according to the process of Example I, 194 parts (1 mole) of dimethyl phthalate and 216 parts (3 moles) of methallyl alcohol were combined to give, after working up in the usual fashion, 246 parts of ester boiling at 181–183° C. at 7 mm. This straw-colored liquid was dimethallyl phthalate.

With 1% added benzoyl peroxide, dimethallyl phthalate polymerized in four hours at 100° C. to a viscous soluble sirup. The same results were obtained on heating this mixture for 2¼ hours at 200° C., followed by two hours at 225° C. Films flowed from a solution of the soluble sirup in butyl acetate were tack-free and hard after an overlight bake at 100° C.

Example IX

By the reaction of 97 parts (0.5 mole) of dimethyl phthalate and 116 parts (2 moles) of allyl alcohol, according to the process described in Example I, there was obtained 108 parts of a colorless liquid boiling at 175° C. at 9 mm. This product was diallyl phthalate.

Diallyl phthalate polymerized to an insoluble gel on heating for 3 hours at 100° C., in the presence of 1% of benzoyl peroxide. In the absence of benzoyl peroxide, the ester thickened very slowly to yield a viscous, yet soluble sirup in three days at 100° C. This product could be used in the formation of coating compositions as described in the previous examples.

While allyl and methallyl alcohols have been employed as representative allyl type alcohols, any allyl type alcohol, i. e., any alcohol containing the carbinol attached by a single bond to an unsaturated carbon atom may be employed. By "unsaturated" is meant unsaturation of the ethylene type, i. e., the unsaturated alcohol has at least one focus of unsaturation of the ethylene type, which focus is joined by a single bond to the carbinol carbon. The unsaturated carbon is therefore non-aromatic. The alcohols may be entirely aliphatic in nature or may contain a cyclic (aromatic, hydroaromatic, or heterocyclic) group. The carbinol group may be primary or secondary.

Any alcohol therefore wherein the carbinol carbon is attached by single bonds to at least one hydrogen atom and to at least one doubly bonded ethylene type carbon may be employed.

The preferred compounds are, however, alcohols which are entirely aliphatic in nature, preferably primary or secondary alcohols of relatively low molecular weight. In addition to the allyl type of unsaturation, the alcohols may contain other unsaturated linkages, as typified in the examples below.

Specific examples of alcohols which fall in the scope of this invention include among many others: CH₃—CH=CH—CH₂OH, crotyl alcohol;

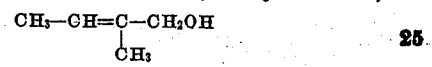

tiglyl alcohol;

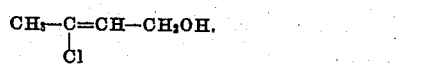

3-chloro-butene-2-ol-1; 3-hydroxybutene-1, CH₂=CH—CHOH—CH₃; 3-hydroxypentadiene-1,4, CH₂=CH—CHOH—CH=CH₂; cinnamyl alcohol, C₆H₅—CH=CH—CH₂OH; 3-hydroxyhexene-1-yne 5, CH≡C—CH₂—CHOH—CH=CH₂; 1-hydroxyhexadiene-2,4,

CH₃—CH=CH—CH=CH—CH₂OH 1-hydroxyhexadiene-2,5,

CH₂=CH—CH₂—CH=CH—CH₂OH 1-hydroxybutadiene-2,3, CH₂=C=CH—CH₂OH; 2-hydroxyhexadiene-3,5,

CH₂=CH—CH=CH—CHOH—CH₃

1-hydroxy-2-methylhexene-2,

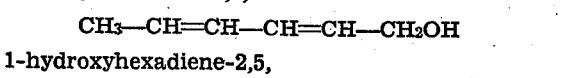

1-hydroxy-2-methylpentene-2,

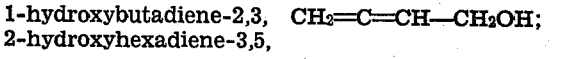

3-hydroxy-2-methylpentene-1-yne-4,

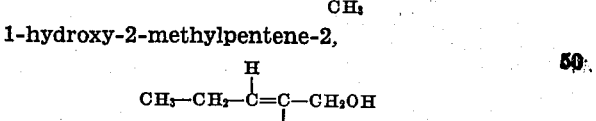

4-hydroxy-2,5-dimethylhexadiene-1,5,

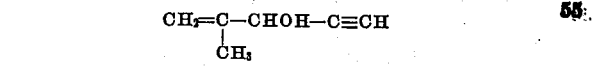

1-hydroxy-3,7-dimethyloctadiene-2,7,

methylvinylcarbinol, isopropenylvinylcarbinol, etc.

The allyl type alcohol may be reacted with the ester of any polycarboxylic acid with a relatively volatile alcohol. The acid may be aliphatic, aromatic, hydroaromatic, or heterocyclic.

Specific examples of aliphatic dicarboxylic acids which are suitable for use in this invention include oxalic, malonic, iso-succinic, butylmalonic, succinic, glutaric, adipic, azelaic and sebacic.

Hydroaromatic (cyclic) carboxylic acids include 1-2 cyclohexanedicarboxylic (hexahydrophthalic) acid, camphoric acid, and camphenic acid. Aromatic acids include phthalic acid, terephthalic acid and naphthalenedicarboxylic acid. Heterocyclic acids such as picolinic, nicotinic, quinolinic, cinchomeronic may also be employed. Carboxylic acids having more than two carboxyl groups are also included within the scope of this invention. Examples of acids of this type include citric, α-β-γ-propanetricarboxylic, α-α-β-γ-propanetetracarboxylic, mellophanic, pyromellitic and trimesic acids, etc.

Substituted acids are also included in this invention particularly substituted polycarboxylic acids whose substituents are relatively stable and inert during the conditions of preparation of the desired esters. As examples of substituted acids may be listed tartronic, tartaric acid, malic acid, 4-nitrophthalic, 4-chlorophthalic, ketopimelic acids, etc.

Any alcohol boiling lower than the allyl type alcohol may be used in the ester. In practice, however, it is satisfactory and most suitable, as well as generally cheapest, to use the ethyl or methyl ester. Particularly when benzene is used as the solvent or carrier, these two alcohols are especially desirable since they form binary mixtures of much lower boiling point than the alcohols themselves, and thus can readily be removed from the reaction mixture.

As alkaline catalyst for the ester interchange reaction, other alkaline materials than those illustrated in the examples may be employed. Thus, in addition to the sodium methylate solution described in the examples, other alkali alkoxide solutions may be employed. A solution of sodium in ethanol (sodium ethylate) has been used satisfactorily, but this solution is somewhat less stable over a period of time than the sodium methylate catalyst solution. One advantage of the sodium alkoxides prepared from the lower alcohols is that the excess alcohol used in preparing the catalyst solution is readily removed from the reaction mixture in the same fashion as is the alcohol formed by the interchange. Catalysts may also be prepared by dissolving an alkali metal in the allyl type alcohol used in the reaction. It is also possible to use concentrated solutions of alkali hydroxides in lower alcohols in place of the alkali metal alkoxide. Furthermore, alkali hydroxides may be used in the solid form, although when this is done it is sometimes difficult to obtain satisfactory solution of the hydroxides in the reacting mixture. Slurries of powdered alkali hydroxides in benzene, toluene, etc. may be used. Alkali metals may also be added directly to the reaction to serve as catalysts. Litharge or calcium oxide may also be used as a catalyst for this reaction, though these materials are much less effective. In some cases, alkali carbonates work satisfactorily. It is probably sufficient that the reacting mixture be maintained merely on the alkaline side to obtain interchange. In general any alkaline ester interchange catalyst may be employed.

As solvents for the interchange reaction, the use of benzene has been illustrated in the examples. This hydrocarbon is very satisfactory for the purpose since it succeeds both in maintaining a low reaction temperature and in serving as a medium for removing alcohol of reaction through distillation as a binary mixture. Toluene may be employed in an equivalent manner, although generally the reaction temperature in the flask will be somewhat higher when this solvent is employed. Any inert material which is relatively low boiling (to facilitate separation from the higher boiling ester) and which is a solvent for the various components of the reaction is satisfactory. Chlorinated aliphatic hydrocarbons such as ethylene dichloride or carbon tetrachloride may therefore be used. Reactive solvents such as methyl acetate or acetone would not be satisfactory for this reaction. The amount of the solvent used in the reaction mixture may be varied from very small amounts to quite large quantities. In general, it may be said that the use of smaller amounts of solvents favors more rapid reaction. It is possible to operate in the absence of an added inert solvent, although this method is less efficacious. This practice requires more careful temperature control, and at the same time, it makes it much more difficult to remove the alcohol of reaction as it is formed.

In forming these esters of saturated polycarboxylic acids it is desirable to employ an excess of the allyl type alcohol. This excess need not be great, but should be sufficient to insure complete reaction. In general the excess should be in the neighborhood of at least 10%. The use of larger proportions of the allyl type alcohol is not undesirable, since it is possible to recover the excess from the final reaction product.

In general the rate of reaction increases with the temperature. With the aid of the inert diluent, such as benzene, the alcohol formed in the ester interchange is removed about as fast as it is formed. The temperature is in general determined by the diluent employed. It can thus be raised by employing toluene or xylene or lowered by using more volatile solvents. In general, atmospheric pressure is employed. Superatmospheric pressures generally offer no advantage. Subatmospheric pressures may occasionally be employed to advantage.

Polymerizations of these new allyl type esters may be carried out in any desired manner. Oxygen-yielding catalysts, for example benzoyl peroxide, are particularly suitable for use in promoting the reaction, although it is possible to operate in the absence of catalysts. The polymerizations are generally slow at low temperatures and require heating in the neighborhood of 100° C. or higher to produce resinification at a reasonable rate. Polymerization at much higher temperatures, for example, 200° C. is, as shown in the examples, quite feasible and in some cases desirable. These higher temperatures have been found to produce very little, if any, discoloration of the esters. Polymerization may be carried out in the presence or absence of solvent, plasticizer, or other material. Emulsions in water lend themselves to polymerization under suitable conditions. The rate of polymerization depends upon the particular acid and alcohol used in forming the ester, and, in general, it is not possible to predict beforehand the relative rate of polymerization of a compound of this class. A higher degree of unsaturation appears to promote polymerization as is illustrated by the fact that the methallyl ester of α-α-β-γ-propanetetracarboxylic acid polymerized at a faster rate than less unsaturated esters, for example, methallyl adipate. The most unusual property of these esters is the fact that, although they polymerize finally to a gelled insoluble infusible state, the polymerization may be stopped at an intermediate soluble form which is capable of being converted further to a more highly polymerized product. The reaction may be conveniently stopped at this intermediate point by merely cooling to a lower temperature. The soluble forms are more or less viscous, resembling somewhat the natural drying oils, especially the bodied oils. On heating further, the polymerization to solid products is completed. Of especial interest is the fact that thin layers, prepared from the bodied esters or from solutions thereof, set up on baking to dry films. These materials are therefore of importance furnishing new coating compositions. As in the case of the natural drying oils, certain metallic driers such as the linoleates or naphthenates of cobalt or manganese accelerate the "drying" of these films. Baking at elevated temperatures, preferably above about 65–75° C. is to be preferred for best results, though slow drying does occur at lower temperatures. These products may be used alone in coating compositions or may be admixed with other materials such as oils, pigments, plasticizers.

The esters of the present invention are not prepared by the usual esterification method of acid plus alcohol plus a catalyst such as sulfuric or hydrochloric acid, due to extensive rearrangement of the unsaturated alcohol by the acid catalysts necessary or desirable for effective esterification.

The preparation of allyl type esters of polycarboxylic acids by such means as reacting the alkenyl halide with a salt of the dibasic acid is likewise disadvantageous since such methods (a) do not start with the allyl type alcohol, (b) give poor yields of impure products, and (c) are generally costly. Other methods of preparation involving alkaline conditions such as the reaction of suitable sodium alcoholates with the acid halides are not desirable.

The esters of this invention are valuable in the unpolymerized form as solvents and plasticizers. Because of their very high boiling points and low volatility as well as because of their chemical make-up, these esters are desirable for use as plasticizers in various types of plastic and coating compositions. They are particularly useful in combinations with cellulose acetate, cellulose nitrate, ethyl cellulose and other cellulose esters and/or ethers. These esters, particularly in the partially polymerized or bodied form described in the examples, are useful in various types of coating compositions. Both with and without added cobalt or other driers, these esters can be "set up" to yield hard, light-colored, tough, flexible films having good resistance to water and to organic solvents. While it is possible to obtain good films from these bodied esters in an unmodified condition, it is sometimes desirable to add other agents as modifying agents. The use of the bodied esters in coating compositions is to be preferred over the use of the unbodied materials, since the viscosity and surface tension characteristics of the bodied esters are much more suitable for use in the production of films. By controlling the degree of bodying, it is possible to obtain products which are of the right consistency and viscosity for use for application at 100% solids or with only slight dilution with organic solvents. This is a definite advantage as it is highly desirable to employ a varnish vehicle of this type at as high solids as is possible. Satisfactory enamels may be prepared by incorporating pigments with the esters, particularly in the bodied form. In preference to using the pure bodied ester itself, it is sometimes desirable to body mixtures of two or more of these esters or one of these esters and another similar material. These esters are also suitable for use in interpolymerizing with other polymerizable compounds such as vinyl esters, acrylic or methacrylic esters, butadiene, styrene, etc. to form products useful in either coating or molding applications.

The esters of polycarboxylic acids of at least six carbon atoms are particularly valuable because of their polymerization and film-forming properties. These esters can be polymerized readily whereas the esters of acids of lower carbon content (Example V) polymerize much less readily.

By a saturated acid is meant one free of ethylenic or acetylenic type of unsaturation. An aromatic ring is not unsaturated in this sense.

The above description and examples are intended to be illustrative only. Any modification of or variation therefrom which conforms to the spirit of the invention is intended to be included within the scope of the claim.

I claim:

Process of preparing a resinous polymer which comprises heating, for two hours at 225° C., a composition having dimethallyl adipate as its sole polymerizable component and containing 1%, by weight of the dimethallyl adipate, of benzoyl peroxide.

HENRY S. ROTHROCK.

CERTIFICATE OF CORRECTION.

Patent No. 2,218,439.                                October 15, 1940.

HENRY S. ROTHROCK.

It is hereby certified that error appears in the printed specification of the above numbered patent requiring correction as follows: Page 2, first column, line 46, for the word "or" read --on--; page 3, first column, line 53-54, for "overlight" read --overnight--; and that the said Letters Patent should be read with this correction therein that the same may conform to the record of the case in the Patent Office.

Signed and sealed this 3rd day of December, A. D. 1940.

(Seal)

Henry Van Arsdale,
Acting Commissioner of Patents.